H. L. HOFFMANN & J. O. DOOLITTLE.
TESTING SYSTEM FOR ELECTRIC CIRCUITS.
APPLICATION FILED JAN. 12, 1914.
1,184,955.
Patented May 30, 1916.
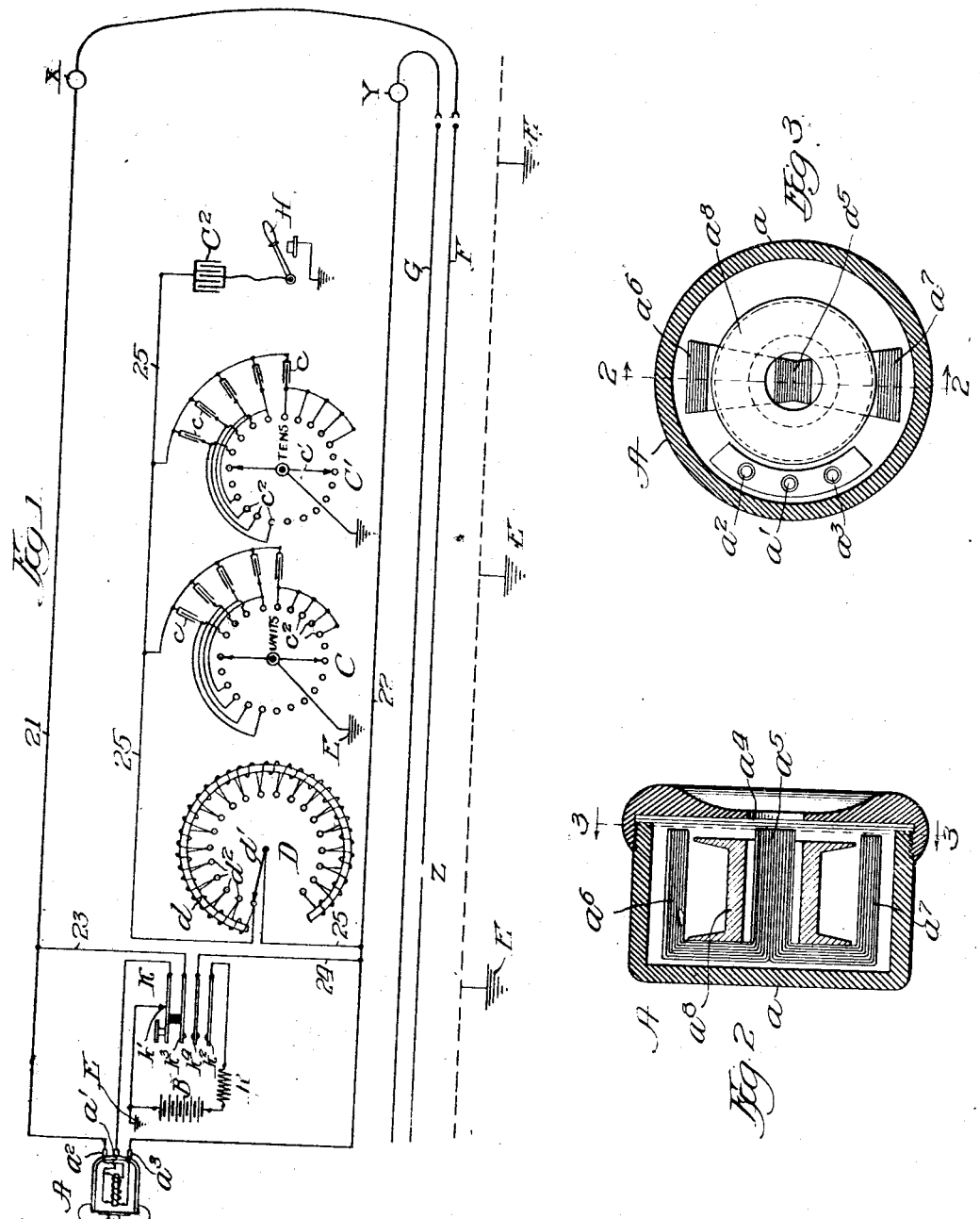

UNITED STATES PATENT OFFICE.

HENRY L. HOFFMANN, OF ST. LOUIS, MISSOURI, AND JAMES O. DOOLITTLE, OF EMPORIA, KANSAS.

TESTING SYSTEM FOR ELECTRIC CIRCUITS.

1,184,955.  Specification of Letters Patent.  Patented May 30, 1916.

Application filed January 12, 1914. Serial No. 811,628.

*To all whom it may concern:*

Be it known that we, HENRY L. HOFFMANN and JAMES O. DOOLITTLE, citizens of the United States, residing at St. Louis, State of Missouri, and Emporia, in the county of Lyon and State of Kansas, respectively, have invented a certain new and useful Improvement in Testing Systems for Electric Circuits, of which the following is a full, clear, concise, and exact description.

Our invention relates to a testing system for electrical circuits, and is particularly designed to permit a rapid and accurate location to be made of breaks or "opens," although it comprises features which are adapted to be of use in connection with the location of faults of other sorts.

Our object is to provide a testing system which shall be simple in its operation and accurate in its results, and which shall involve apparatus that is cheap and durable and not likely to get out of order. To this end, we prefer to employ as the indicating instrument of the system a device capable of giving an audible signal, and operating on the principle of a telephone receiver, but comprising certain modifications over the ordinary telephone receiver which particularly adapt it for the work it is called upon to do. In connection with this indicating instrument, we prefer to employ an artificial line,—that is, a collection of electrical devices such as condensers, resistances and reactances with means for bringing them into operative connection with the testing system, so that the characteristics of the line under test with respect to its capacity, resistance and inductance may be simulated in the artificial line.

We prefer so to arrange the circuits and apparatus of our testing system that the characteristics of the artificial line may be varied at will to bring them into correspondence with the characteristics of the particular line under test, the indicating device being employed to indicate when the state of balance between the artificial line and the line under test is reached. The movable parts which control the characteristics of the artificial line may be so arranged that they will indicate, by their position when the state of balance is reached, the distance to the fault in the line under test.

One of the forms in which our invention may be embodied is illustrated in the accompanying drawings, wherein—

Figure 1 illustrates the circuit arrangement of our testing system, the apparatus involved being shown diagrammatically; Fig. 2 is a sectional elevation of the indicating device on lines 2—2 of Fig. 3; and Fig. 3 is a sectional plan view of the same on lines 3—3 of Fig. 2.

Referring to the drawings, A is the indicating or responsive device, which is constructed in the form of a telephone receiver.

B is a source of current.

K is a key for controlling the connection and disconnection of the various devices in the circuit.

C, C' and $C^2$ are devices for introducing capacity into the artificial line.

D is a device for introducing resistance and reactance into the artificial line.

R is a regulating or limiting resistance, and X and Y are terminals for connecting the testing organization with the line circuits in making the test.

The earth connections are designated by the letter E in the drawing, the faulty or open line by F, and the good line, which may be paired with the faulty line, by G. The break in the circuit under test is indicated at Z.

The telephone receiver A, the construction of which we shall describe more particularly hereinafter, has two windings. The wires of these windings are wound together on the core of the receiver, so that the two coils will have the same electromagnetic effect upon the receiver diaphragm. The two windings are connected together at opposite ends, and this connection is extended to the middle one $a'$ of the three terminals of the receiver. The other ends of the windings are connected each with one of the other two receiver terminals $a^2$, $a^3$. The middle or neutral terminal $a'$ of the receiver is connected to ground E, this connection being normally closed in contacts $k'$ of the key K, and being adapted to be opened when the key is depressed. The other two receiver terminals $a^2$, $a^3$, are connected with the terminals X and Y, respectively, by way of the conductors 21, 22.

From the conductors 21, 22, which connect the terminals of the receiver with the terminals X and Y, respectively, branches 23, 24 extend to contact springs $k^3$ and $k^4$ of the key K. These branches are normally open in the key contacts, but are adapted, when the key is depressed, to be first connected together by the engagement of the springs $k^3$ and $k^4$ with each other, and then to be extended to the free pole of the battery or source of current B by the engagement of the springs $k^3$, $k^4$ with the contact spring $k^2$ of the key. The sequence of operation of the key contacts is such that the normally closed contact points $k'$ open before the springs $k^3$ and $k^4$ engage each other and the contact spring $k^2$.

The variable resistance-reactance device D and the variable capacity devices C, C' and $C^2$, are connected with a branch 25 extending to earth from the conductor 22 which unites the receiver terminal $a^3$ and the terminal Y. The resistance-reactances in the device D are divided, in the specific form shown, into twenty units $d$, each consisting preferably of a few turns of wire upon an iron core. This combined resistance and reactance is associated with a dial switch, the arm $d'$ of which is adapted to be rotated to include serially in the circuit of the branch 25 any desired number of the resistance-reactance units, these units terminating upon the circle of contact disks or plates $d^2$ that are engaged by the arm $d'$ in its rotation. The arm $d'$ may normally rest upon the first contact disk of the series so as to exclude the resistance-reactance from the circuit of the branch 25.

The variable capacity devices C and C' similarly consist of a series of condensers $c$ controlled, with respect to their inclusion in the circuit of the branches 25, by dial switches, each switch consisting of a double arm $c'$, the ends of which engage circles of contact disks $c^2$ with which the condensers $c$ are connected.

The condensers of the variable capacity device C (marked "Units") are constructed to have one, two, three, four and five units of capacity, respectively, while the condensers of the variable capacity device C' are constructed to have ten, twenty, thirty, forty and fifty units of capacity, respectively.

In order to increase the range of the variable capacity devices C and C' beyond the value represented by the largest of the associated condensers, we prefer to arrange the switch connections so that from the fifth to the ninth contact point of the switch, the largest of the associated five condensers will remain in circuit, and the condensers of smaller capacity will be successively added as the switch arm is rotated. This we do in the variable capacity device C by connecting the condenser having one unit of capacity to the contact point on the dial which is diametrically opposite the sixth contact point of the series, the condenser having two units of capacity with the contact point diametrically opposite the seventh contact point in the series, and so on. Thus, when the switch arm $c'$ reaches the sixth position, it retains in circuit the condenser having five units of capacity, and also includes the condenser having one unit of capacity, thus connecting six units in all in the branch circuit 25. When the switch arm moves to the next or seventh position, it retains in circuit the five unit condenser and adds the two unit condenser, thus making seven units of capacity, and so on. This same arrangement is employed also in controlling the condensers of the variable capacity device C', or "tens" device.

By adjusting the switch arms of the variable capacity devices C and C' on their respective dials, it is possible to include in the circuit of the branch 25 any desired number of units of capacity, from one unit to ninety-nine units. Each of the five condensers of each device has one of its terminals permanently connected with the branch 25, and is made effective to add its capacity to the branch 25 by having its other terminal connected with the ground E by way of the grounded arm $c'$ of the associated dial switch when the arm engages the corresponding contact point. Further, to increase the range of the instrument with respect to the capacity which it may include, we preferably provide another condenser $C^2$ having one hundred units of capacity, which may be brought into circuit by closing the associated knife switch H.

We prefer so to construct the condensers that a unit capacity will correspond with some known unit of line length. For instance, if the longest line wire upon which it may be necessary to locate a fault is one hundred miles, each of the one hundred and ninety-nine capacity units may be constructed to have a capacity value equal to that of one-half a mile of wire. By thus using arbitrary units corresponding with the capacity of the lines of the sort that are to be tested, it is possible to make the instrument read directly in miles, or other units of length.

It will be understood that it is possible to employ different forms of switches for the control of the variable capacities and variable resistances and reactances, the particular form illustrated merely being one which we have found it convenient to use in practice.

The telephone receiver which we prefer to use as the indicating device of our system is constructed in a manner particularly to adapt it for the use to which it is put. The construction is illustrated in Figs. 2 and 3. The receiver consists of the usual shell $a$ and diaphragm $a^4$. The electromagnet, however, is not of the sort ordinarily employed with such telephone receivers. In its preferred form it consists of a core $a^5$ and return pole pieces $a^6$, $a^7$ with a spool $a^8$ surrounding the core, and upon which the double winding hereinafter referred to is placed. The core $a^5$ and the return pole pieces $a^6$ and $a^7$ are presented to, but out of contact with, the diaphragm $a^4$. This arrangement gives a short magnetic circuit of comparatively small reluctance, thus making the magnetic reactance of the receiver comparatively large. The telephone receiver, it will be observed, does not include the usual permanent polarizing magnet. We have found in practice that a non-polarized magnet of the sort illustrated and described gives much better results in making the tests for which our system is particularly adapted. When the permanent polarized magnet is employed, the receiver is made much more sensitive to the inductive disturbances which are usually present on the line under test,—the disturbances being of a sufficient magnitude at times to mask the indication which the receiver is intended to give in response to the application of the testing current. By constructing the receiver, as above described, this disturbing factor is minimized.

In using the system of our invention to locate a break in a line, the operation is as follows: The line to be tested is connected with the terminal X. The faulty line has an electrostatic capacity the value of which depends upon the distance to the point where the line is broken, the capacity being due to the condenser action between the line wire F and the ground or earth E. When the line F is connected with the terminal X, the key K is depressed. This first disconnects the middle or neutral terminal $c'$ of the telephone receiver from earth, and then connects the branches 23, 24 of the conductors 21, 22 first together, and then both to the free terminal of the battery B. The free pole of the battery B is thus connected with the line F under test, and that line receives a charge, the value of which will depend upon its electrostatic capacity, which in turn depends upon the distance to the break.

Assuming that the switch arms of the dials C, C′ and D are standing in their normal positions, so as to exclude their associated condensers and reactances from the circuit, and assuming too that the switch H is open, no charge will be communicated to the artificial line which these devices constitute and control. Consequently, when the key K is released, and operates first to disconnect the branches 3, 4 from each other and from the battery and then to connect the neutral terminal of the telephone receiver A to earth, the charge imparted to the line under test flows back and passes through one of the differential windings of the telephone receiver to earth. This produces a click in the receiver.

If a charge of equal value had at the same time passed through the other differential winding, each would have neutralized the other with respect to the electromagnetic effect and there would have been no sound in the receiver upon releasing the key K. This condition is obtained by manipulating the controlling devices to create an artificial line having the same capacity as the line under test. Therefore, the dial switches C, C′ and, if necessary, the knife switch H, are adjusted until upon closing the key K and releasing it no click is heard in the telephone. The absence of a click indicates that the artificial line is of the same value as the line under test; and, if the capacity units have been made equal to units of line length, the distance to the fault may be directly read upon the dials of the variable capacity devices.

If the line under test is one conductor of a metallic circuit, and the other conductor G is available in making the test, the faulty wire F may be connected with the terminal Y of the testing apparatus and the good wire G may be connected with the terminal X. In this case the discharge through one winding of the telephone receiver upon releasing the key K is that from the full length of the wire G to the distant end, while the discharge through the other differential winding is that from the wire F as far as the break Z. Consequently, in order to obtain a balance and no click in the telephone receiver, it is necessary to add to the side of the circuit connected with the wire F an artificial line having the capacity value of the portion of the line F beyond the break Z. This is done by manipulating the dials of the variable capacity devices; and when they have been adjusted to produce silence in the telephone receiver on releasing the key K, the distance indicated upon the dials is equal to that from the distant end to the break Z.

Where the line under test is short, its inductance is ordinarily too small to be important. Where the line is of such length that its inductance becomes a factor in the test, it may be compensated for by including inductance in the artificial line by means of the variable resistance-reactance device D. The inductance, by increasing the time constant of the line under test, slows down the discharge and makes it proceed at a different rate from the rate of discharge of the artificial line. As a result of this, it may be difficult, when the artificial line has no reactance in circuit, to obtain the balance that gives silence in the telephone receiver. When this condition is encountered, the variable capacity devices C, C′ are adjusted to get as nearly a balance as possible, and then inductance is inserted by advancing the switch arm of the device D from its normal position. By moving the switch arm of the device D back and forth, and making corresponding slight changes in the variable capacity devices C and C', a balance may be obtained which will entirely or practically suppress any click in the telephone receiver when the key K is released.

By constructing the telephone receiver, as heretofore described, so as to have a relatively high inductance or magnetic inertia, the inductance of the line under test is made of less importance, so that it is necessary to manipulate the variable resistance-reactance only when the line under test is so long as to make its inductance considerable. By giving the telephone receiver a relatively high magnetic inertia, and by omitting the polarizing permanent magnet, the device is made to have an integrating action with respect to the currents that flow through it; and this action operates both to give a balance more readily between the artificial line and a line under test differing in their inductances, and also to integrate and suppress the magnetic effect of the slight inductive alternating currents which produce the disturbances on the line heretofore referred to as masking the test click.

Although we have described and illustrated the ground or earth as serving as one plate of the condenser of which the wire under test forms the other plate, and as being connected with one pole of the battery, it will of course be understood that an earth connection is not necessary in making certain tests for which the system of our invention is adapted,—as, for instance, tests in which one wire in a cable is tested against its mate wire or against the other wires of the cable bunched together. In making such a test the mate wire or the bunched wires of the cable would take the place of the ground connection in the circuit as illustrated.

What we claim is:—

1. A testing system, comprising two condensers, one of said condensers including the line under test, means for varying the capacity of one or the other of said condensers by definite amounts to equalize the same, a balanced responsive device with opposite sides of which said condensers are permanently connected during test, and means for imparting equipotential charges to said condensers and causing said charges to operate simultaneously upon said balanced responsive device.

2. A testing system, comprising two condensers, one of said condensers including the line under test, means for varying the capacity of one or the other of said condensers by measured amounts to equalize the same, means for imparting equipotential charges to said condensers, a circuit having a common portion and two branches, said condensers being connected respectively with said branches, a balanced telephone receiver having connection with said branches, and a switch included in said common portion and adapted when operated, to close the discharge circuit for both of said condensers.

3. A testing system, comprising a divided circuit, a balanced responsive device permanently connected with the branches of said divided circuit, means for connecting the line under test with one of said branches, an artificial line containing an adjustable capacity associated with one of the branches of said circuit, and means for imparting equipotential charges simultaneously to said branches without interrupting the same and causing said charges to operate simultaneously on said balanced responsive device.

4. A testing system for open lines, comprising an artificial line containing a variable capacity, means for imparting equipotential charges to said artificial line and the line under test, a balanced telephone receiver connected with said artificial line and the line under test, and means for closing a return path from the neutral point of said balanced receiver to cause the simultaneous discharge of said artificial line and the line under test to opposite sides of said receiver.

5. A testing system, comprising a divided circuit having one branch adapted to be connected with the line under test, a switch controlling the undivided part of said circuit, means made active in the operation of said switch for causing equipotential charges to flow simultaneously in the branches of said circuit, a balanced telephone receiver adapted to respond to any inequality in such simultaneous flow in said branches, and an artificial line connected with said divided circuit and adjustable to create a condition of balance in said receiver.

6. A testing system for open lines, comprising an artificial line containing variable capacity, means for simultaneously imparting equipotential charges to the artificial line and the line under test, and a nonpolarized differentially wound telephone receiver arranged to respond to any inequality in the charges imparted to the artificial line and the line under test.

7. A testing system for open lines, comprising an artificial line containing variable capacity, means for imparting equipotential charges to the artificial line and the line under test, a non-polarized balanced telephone receiver, and means for discharging the artificial line and the line under test simultaneously to opposite sides of said balanced receiver.

8. A testing system for open lines, comprising an artificial line containing variable capacity, means for imparting equipotential charges to the artificial line and the line under test, a differentially wound non-polarized telephone receiver, and means for simultaneously discharging the artificial line and the line under test each through one of the windings of said differential receiver.

9. A testing system for open lines, comprising an artificial line containing variable capacity, means for imparting equipotential charges to said artificial line and the line under test, a balanced telephone receiver having relatively large magnetic inertia, and means for simultaneously discharging said artificial line and the line under test to opposite sides of said balanced telephone receiver.

10. A testing system, comprising an artificial line containing variable capacity, means for simultaneously imparting equipotential charges to said artificial line and the line under test, and a balanced telephone receiver having relatively large magnetic inertia, said balanced receiver being arranged to respond to any inequality in the charges imparted to said artificial line and the line under test.

11. A testing system for open lines, comprising an artificial line having variable capacity and variable resistance-reactance, means for imparting equipotential charges to said artificial line and the line under test, a balanced non-polarized telephone receiver, and means for simultaneously discharging said artificial line and the line under test to opposite sides of said balanced receiver.

12. The combination with a testing system for electrical circuits, said system being arranged to balance an artificial line against the line under test, of a non-polarized telephone receiver having a magnetic circuit of relatively small reluctance, said telephone receiver constituting the indicating balance between the artificial line and the line under test.

13. A testing system, comprising a battery having one pole grounded, an artificial line, a balanced responsive device connected with said artificial line and the line under test, and a key adapted in one position to connect said artificial line and the line under test directly to the free pole of said battery and in another position to connect the neutral point of said balanced responsive device to ground.

14. The combination with a testing system for electrical circuits, said system being arranged to balance an artificial line against the line under test, of a non-polarized differentially-wound telephone receiver, said telephone receiver constituting the indicating balance between the artificial line and the line under test.

15. A testing set, comprising a divided circuit, connection terminals in which the branches of said divided circuit terminate and with one of which the line under test is adapted to be connected, a balanced responsive device connected with said branches, an artificial line having a variable capacity connected with one of said branches, and means for simultaneously charging and discharging said branches.

16. A testing set, comprising a circuit having a common portion and two branches, an adjustable condenser connected with one of said branches, means for applying equipotential charges to said branches without interrupting the same, a balanced telephone receiver having connection with said branches, a common discharge path by way of said common portion, and a switch for closing said path included in said common portion.

In witness whereof, I, hereunto subscribe my name this 24th day of December, A. D. 1913.

HENRY L. HOFFMANN.

Witnesses:
M. P. SMITH,
G. E. FOLK.

In witness whereof, I, hereunto subscribe my name this 23 day of December A. D., 1913.

JAMES O. DOOLITTLE.

Witnesses:
L. W. WAYMAN,
D. J. EVANS.